UNITED STATES PATENT OFFICE.

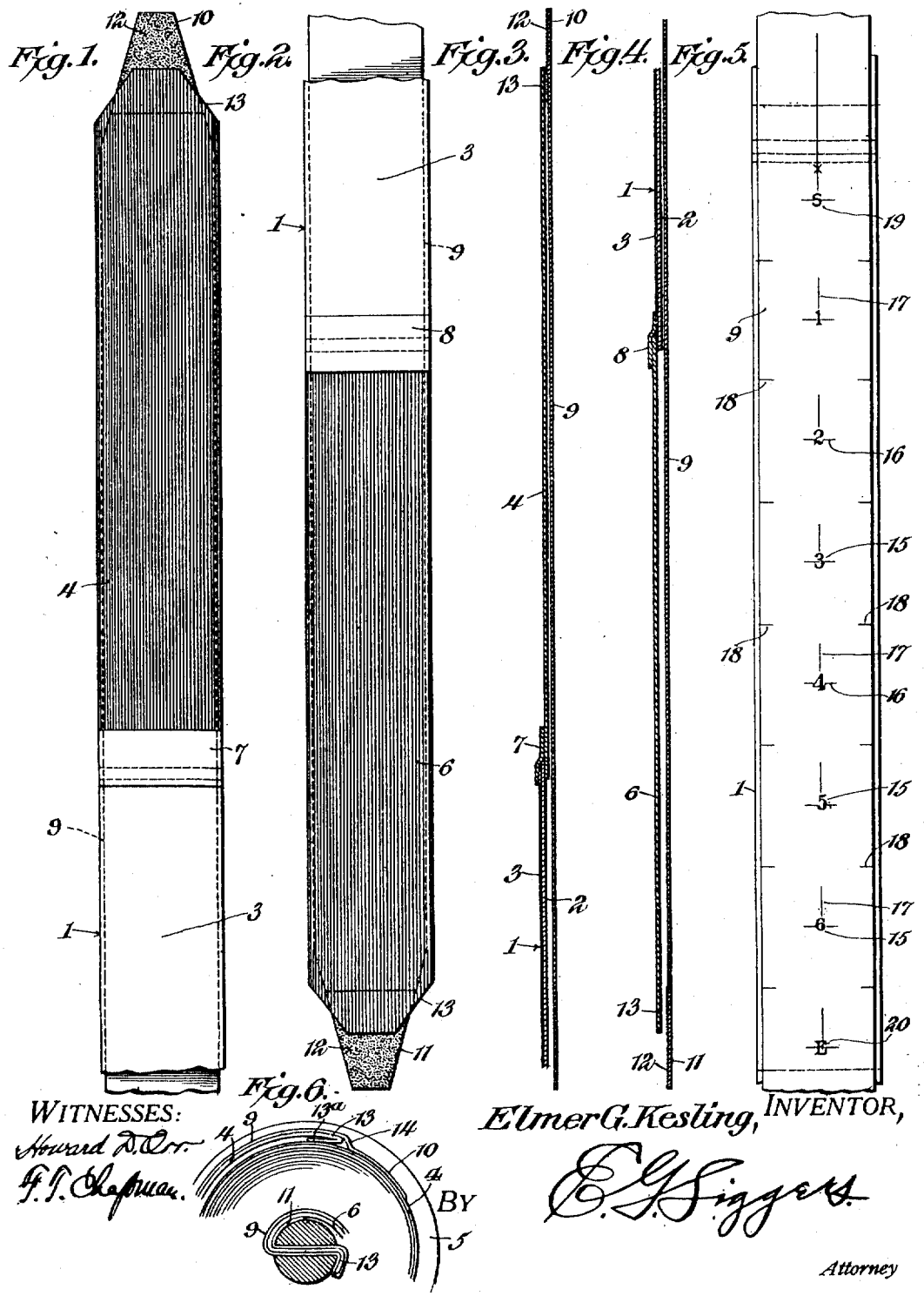

ELMER G. KESLING, OF BLOOMFIELD, MISSOURI.

PRINT-TITLING-FILM ROLL.

1,234,770.   Specification of Letters Patent.   Patented July 31, 1917.

Application filed December 1, 1915. Serial No. 64,537.

*To all whom it may concern:*

Be it known that I, ELMER G. KESLING, a citizen of the United States, residing at Bloomfield, in the county of Stoddard and State of Missouri, have invented a new and useful Print-Titling-Film Roll, of which the following is a specification.

This invention has reference to print titling film rolls, and its object is to provide a photographic film for roll film cameras whereby a suitable title may be applied to the film for each exposure while the film is in the camera.

In accordance with the present invention the sensitive film, by which term is meant the usual flexible carrier and emulsion thereon, has attached to its ends suitably long strips of opaque material, which usually consists of paper opaque to actinic light, so that a film cartridge may be placed in the camera and unrolled to a suitable extent and connected to the empty spool in the camera without danger of exposure of the sensitive film. One of the opaque strips also serves to protect the sensitive film after having been rolled upon the second spool, so that the exposed film may be taken from the camera without danger of being affected by light.

In conjunction with a suitable length of film having the opaque paper and extensions, there is provided a strip of material of light-transmitting qualities usually made long enough to reach from one end of the strip of sensitive film and its opaque extensions to the other end thereof. Such strip of light-transmitting material is customarily made of white paper, and in practice may be a type of white paper known as tracing paper. The arrangement is such that should the film be unrolled outside of the camera, actinic light would have free access to the sensitive film through the white paper.

The ends of the white paper are preferably provided with adhesive, so that its ends may be employed in the same manner as it is customary to employ stickers in roll film cartridges. Furthermore, such imprints as it is customary to place upon film cartridges may be placed upon the white paper, and such paper strip may also carry other printed information or indications.

Because of certain conditions present in the film structure of the present invention the attachment of the ends of the sensitive film strip and the opaque paper terminal strips may depart to a certain extent from the ordinary practice, and because of the character of the white paper it is made somewhat narrower than either the sensitive film or the opaque paper and extensions thereof.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified, so long as such changes and modifications come within the scope of the appended claims.

In the drawings:—

Figure 1 is a plan view of one end of the sensitive film with its opaque paper extension and the light-transmitting paper strip associated therewith.

Fig. 2 is a similar view of the other end of the film.

Fig. 3 is a longitudinal central section of the structure of Fig. 1.

Fig. 4 is a similar section of the structure of Fig. 2.

Fig. 5 is a plan view of the sensitive film with the white paper strip covering it and displaying certain imprinting which may be provided on the white paper.

Fig. 6 is a fragmentary cross-section of a film cartridge showing it rolled upon a suitable spool.

Referring to the drawings there is shown a strip 1 of sensitive film such as is customarily used in film cartridges. Such film comprises the usual backing 2 customarily of celluloid, and a facing 3 of sensitized emulsion. So far as the present invention is concerned the film 1 may follow the usual practice, and is in the form of an elongated strip of suitable width, and also of suitable length dependent upon the size of the prospective picture for which the film is intended and the number of successive exposures to be made upon the film.

Attached to one end of the film is another strip 4 of material opaque to actinic light, and this strip may consist of paper such as is usually employed in film cartridges for protecting the film from actinic light. In some instances such paper consists of black paper and in other instances of paper red on one face and black on the other. The paper strip 4 is made of sufficient length to provide a suitable number of turns about the film when rolled upon a spool 5 to effectively shield the sensitive film from access of actinic light even when the paper strip 4 is unrolled to an extent necessary in threading it through the camera from the spool carrying the unexposed film to the empty spool at the other end of the camera in the usual manner.

Attached to the opposite end of the film from the strip 4 is another similar strip 6 of opaque paper having the purpose of protecting the sensitive film after exposure and when it has been wound upon the receiving spool, so that the exposed film is shielded from access of actinic light when removed from the camera.

The paper strip 4 is connected to the film 1 by overlapping the corresponding ends of the film and paper for a short distance and connecting such overlapping ends by a sticker 7 having cementing material which will stick to both the paper and film, the overlapping being so arranged that the end of the paper where attached to the film is in trailing relation to the direction of travel with respect to the end of the film which it overlaps. The paper strip 6 is similarly connected to the other end of the film by a sticker 8, but in this case the film overlaps the corresponding end of the paper strip 6 so as to be in trailing relation thereto in the direction of travel.

The peculiar mode of attaching the film to the terminal paper strips is adopted because in a camera adapted to the use of the print titling film the latter travels along one face of a plate and the trailing relation of the overlapping ends prevents any liability of these ends catching on the plate. Moreover, such overlapping arrangement prevents any liability of the film curling away from either the backing paper strip or the backing apron employed in a developing tank when the film is placed in such tank.

Extending lengthwise of the film and paper extensions is a strip 9 of light-transmitting material, preferably, though not necessarily, of paper of the kind commonly known as unglazed tracing paper. This paper strip is applied to the back of the film, that is, that face of the film remote from the emulsion, and, of course, the paper strip 9 should be of a character containing no materials in any wise deleterious to the emulsion. There is a brand of tracing paper commercially known as "Sandow" paper, and this has proven in practice to be especially useful for the purpose. Any paper of light-transmitting qualities and also of sufficient toughness and durability, and also having other qualities which will hereinafter appear, may be employed.

The paper strip 9 is made somewhat narrower than the width of the film or the terminal strips 4 and 6, so as not to be interfered with by the flanges of the spools upon which the film is rolled, since the paper strip 9 is quite thin and flexible and, as will hereinafter appear, being free from connection with either the film or its extensions except at one of the extremities, is liable to become distorted if made of the full width of the parts with which it is associated. The difference in width between the strip 9 and the film and its end strips need only be a small fractional part of an inch.

The ends of the paper strip 9, which ends are indicated at 10 and 11, respectively, are prolonged beyond the corresponding ends of the paper strips 4 and 6 where such ends 10 and 11 are provided with layers 12 of a suitable adhesive, so that these ends 10 and 11 may perform the functions of stickers. The adhesive is extended sufficiently along the ends 10 and 11 so that one extremity of the strip 9 may be made to adhere to the corresponding end of that strip, say, the strip 4, which is exposed on the spool as it leaves the factory. The outer extremity of the strip 4 is tapered, as indicated at 13, so that it may be returned upon itself for a short distance, as indicated at 13$^a$, in Fig. 6, with the adhesive end 10 of the strip 9 united to the end 13 and then carried upon the next inner turn of the strip 9 and stuck thereto, all as indicated in Fig. 6, so that the rolled up film cannot accidentally unroll. Moreover, the extra thickness provided by the folded-in end 13$^a$ provides a convenient severing or tearing portion 14 of the extremity 10 when it is desired to disconnect the two turns of the strips united by the adhesive extremity 10.

When the portion 14 is severed the ends 10 and 13 of the strips 9 and 4 are united by the adhesive 12, so that the two strips are moved together in threading them through the camera in the initial placing of the film roll in the camera and connecting them to the corresponding spool, such operation being the same as that usually employed, except for certain modifications in the operation which will hereinafter appear.

When the film has been exposed in the customary way and it is desired to remove it from the camera, the receiving spool is turned sufficiently to wind the strip 6 thereon and after the camera is opened, as usual, the end 11 is moistened where covered with adhesive 12 and attached to the last turn of the strip 6 and also connected to the next inner turn of the strip 9 in the same manner as is illustrated in Fig. 6 with respect to the strip 4.

The paper strip 9 is provided with the customary imprints 15 for positioning the sensitive film with relation to the field of the camera lens, these imprints being visible as usual through the red window provided in the camera back.

In the use of a print titling film it is important that the film be positioned for exposure quite accurately and in order to bring this about each number or character imprint 15 has a cross mark 16 designed to coact with a suitable indicator on the camera. Each number or other character 15 is also provided with an approaching mark 17, warning the observer of the approach of the indicia to prevent overrunning of the positioning mark 16. The strip 9 may also be provided with marks 18 for indicating the points of severance of the film, where such is desired, while other indicia, such as a letter "S", indicated at 19, and positioned to precede the exposure point for the first end of the film and another indicia 20, such as the letter "E" situated near the other end of the film, have functions which will hereinafter appear.

The film of the present invention is designed for use in connection with a type of camera such as shown and described in a companion application Serial No. 64,536 for print titling camera filed December 1, 1915.

In order that the purpose of making the roll film as described may be fully understood, it is necessary to consider the fact that in a camera of the type shown and described in the said companion application there are two plates or plate-like structures interposed between the sensitive film and the light transmitting backing when the film roll is in working position in the camera, and these plate-like structures are opaque to actinic light, so that while the light transmitting backing is exposed to view, especially where the title is written or otherwise produced upon it, the sensitive film is protected from actinic light. Again, the usual sight window in the back of the camera for positioning the film by indicia on the backing is in turn backed up by an opaque plate, so that at such point the sensitive film is protected from the access of light, even though by the use of a red window the actinic value of the light is greatly reduced. Still since the film backing strip in itself does not protect the sensitive film actinically, there is a liability of fogging the film even through a red window, and for this reason when the film is in the camera the sensitive surface is protected by truly non-actinic means in addition to the red window, but without at all hiding the indicia on the backing sheet.

It is because of the presence of the plate-like structures referred to that the backing sheet is not directly connected to any point of the sensitive film or its carrier, and is only connected primarily to the entering end of the actinically opaque-threading and protecting strip extended from the forward end of the sensitive film and is not positively connected to anything at the other end, although for certain purposes such other end of the backing strip may be made fast to the roll film after removal from the camera.

The roll film of the present invention distinguishes from other roll films in that the backing strip of light transmitting material is, during the application of the title thereto, exposed freely to actinic light and to view, but because there is no attachment of any part of the backing strip directly to the sensitive film or its carrier, it is possible to so expose the backing strip even though transmissible of actinic light without any danger of having the sensitive film affected by such actinic light.

It is a feature of the film roll that the film is provided with a backing strip of light-transmitting material of such character and so related to the sensitive film that it may transmit actinic light through it directly to the film without any manipulation of the backing strip, and while white paper has been described as the most available material for the purpose, it will be understood that other light-transmitting materials may be used.

While for facility of manufacture the backing strip 9 has been described as of white paper and as extending for the full length of the film and its opaque paper terminal portions, and as also having ends projecting beyond the ends of such terminal portions and provided with adhesive to act as stickers, other arrangements may be employed so long as the results toward which this invention aims are obtained. The main purpose is to provide a roll film with means whereby the title or other marks which it is desired to reproduce upon the finished print may be made at the will of an operator in such relation to the sensitive film after it is in position to be exposed to the lens image, that when the sensitive film is exposed to the action of light in conjunction with the title or other writing or marks the film is shielded from the light by the marks of the title, but is exposed to the effects of light immediately thereabout, and consequently the title appears upon the finished print as dark reproduction of the original writing, assuming that such original writing is made by the operator with a pen or pencil.

The word title is used in the sense of a word or short description of the subject of the photograph, or of any identifying mark or marks, or even of a signature or other data.

The backing strip 9 is made fast to the outer end of the terminal strip of the rolled film by a sticker in the customary manner, which sticker may be a separate piece or in the particular showing of the drawings is made in one piece with the backing strip. The other end of the backing strip is not initially secured to the other terminal strip of opaque material, but is only secured thereto after the film has been unrolled from the original spool and rerolled upon the second spool in the camera, and this fastening of the backing strip may be accomplished either by an integral sticker or a separate one.

As the film roll is placed upon the market for sale, the inner wound end of the opaque extension of the film and the corresponding end of the backing strip are not secured together at all, whether or not the sticker be integral with the backing strip.

The taper of the ends 10 and 11 of the backing strip is more acute or longer than the tapered ends 13 of the strips 4 and 6.

It will be understood that so far as the backing strip 9 is concerned its function as a light transmitting medium upon which the title or other marking is applied will be accomplished whether the strip be transmissible of actinic light throughout its length or simply for the length of the sensitive film 1 with those portions coinciding with the strips 4 and 6 opaque to actinic light, or whether it be otherwise arranged, so long as suitably located restricted areas are provided for the application of the title, with the parts immediately adjacent to the applied title transmissible of actinic light.

What is claimed is:—

1. A print-titling film-roll comprising a strip of sensitive film with extension strips of opaque material at the ends, and a backing strip of a material transmissible of actinic light and of a length substantially that of the film and the extension strips and in normal contact with the rear face of the film, the extremities of the backing strip having an adhesive material applied thereto, whereby such extremities serve as stickers.

2. A print-titling film-roll, comprising a strip of sensitive film with extension strips of opaque material at the ends attached to the strip of sensitive film, and a backing strip of a material transmissible of actinic light and of a length substantially that of the film and the extension strips and in normal contact with the rear face of the film, said backing strip being wholly free from direct attachment to the film and extension strips except at the front or threading end of the forward extension strip.

3. A print titling film roll, comprising a strip of sensitive film and a backing strip of material transmissible of actinic light and in normal contact with and wholly free from direct attachment to the rear face of the sensitive film, said backing strip having imprints thereon serially indicating the portion of the film to be exposed with each imprint provided with a positioning indication for accuracy of location of the parts of the film to be included in the exposures.

4. A print titling film roll, comprising a strip of sensitive film and a backing strip of material transmissible of actinic light and in normal contact with and wholly free from direct attachment to the rear face of the sensitive film, said backing strip having imprints thereon serially indicating the portion of the film to be exposed with each imprint provided with a positioning indication for accuracy of location of the parts of the film to be included in the exposures, and said backing strip having other imprints for locating the exposure positions for titles or other writings not located by the serial indicia.

5. A print titling film roll, comprising a strip of sensitive film of suitable length with lengths of opaque material at the ends, and a backing strip of material transmissible of actinic light separate from and in normal contact with the rear face of the sensitive film, said backing strip being of less width than the film and terminal strips.

6. A print titling film roll, comprising a strip of sensitive film of suitable length, a backing strip of material transmissible of actinic light in normal contact with and wholly free from direct attachment to the rear face of the sensitive film, and lengths of opaque material at the forward and rear ends of the sensitive film, the forward strip of opaque material overlapping the rear face of the film and the rear strip of opaque material overlapping the sensitive face of the film, and stickers applied to the overlapping portions of the film and opaque strips on the sensitive side of the film.

In testimony, that I claim the foregoing as my own, I have hereto affixed my signature in the presence of two witnesses.

ELMER G. KESLING.

Witnesses:
JOHN H. SIGGERS,
DAVID R. WAGNER.

Copies of this patent may be obtained for five cents each, by addressing the "Commissioner of Patents, Washington, D. C."